No. 12,831. REISSUED JULY 14, 1908.
W. R. WARREN.
ROTARY KILN.
APPLICATION FILED DEC. 13, 1905.
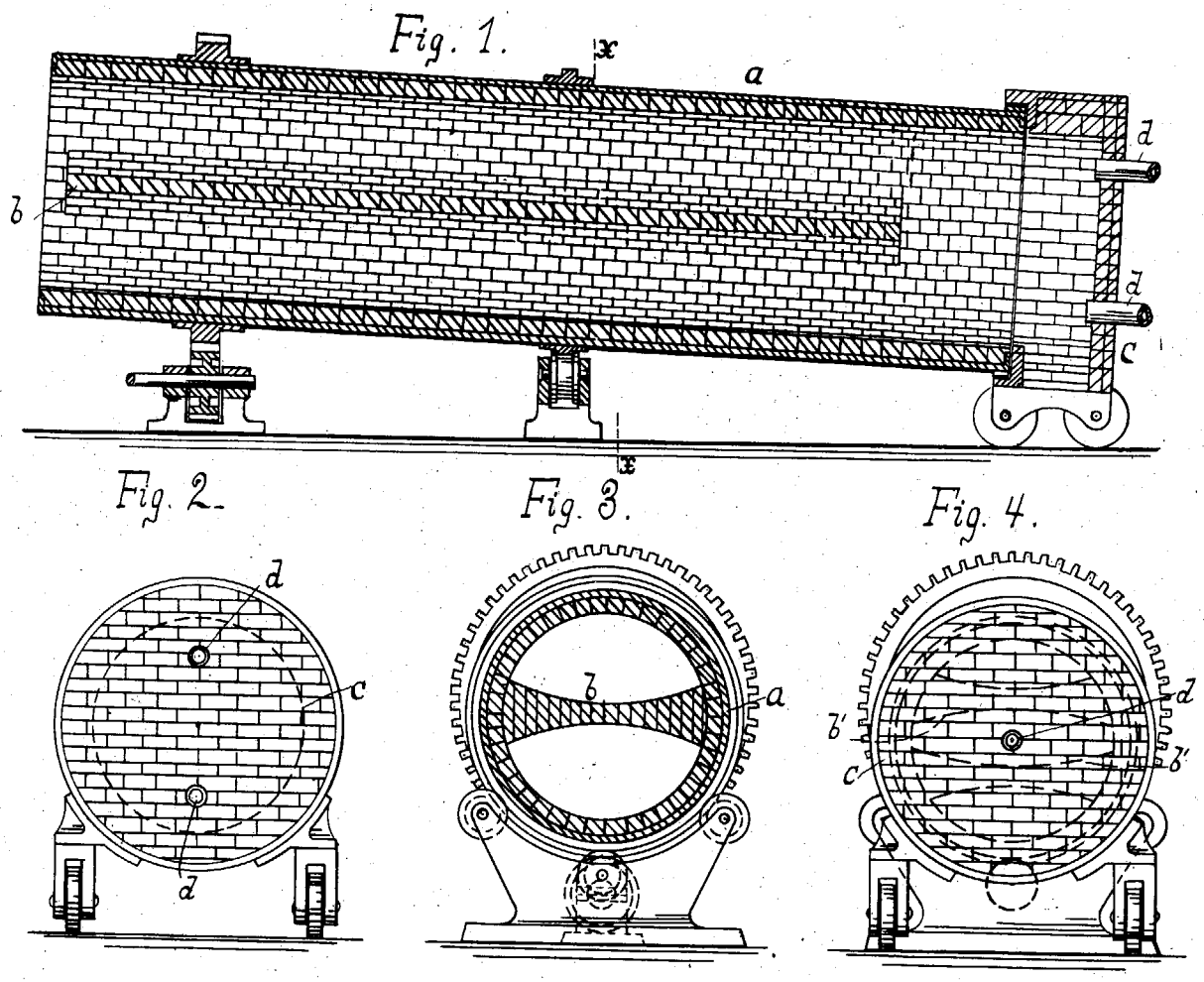
WITNESSES:
George Hulsberg
Edward Wiener
INVENTOR
William R. Warren
BY W. C. Hauff
ATTORNEY.

UNITED STATES PATENT OFFICE.

WILLIAM R. WARREN, OF NEW YORK, N. Y.

ROTARY KILN.

No. 12,831. Specification of Reissued Letters Patent. Reissued July 14, 1908.

Original No. 804,076, dated November 7, 1905, Serial No. 258,545. Application for reissue filed December 13, 1905. Serial No. 291,653.

*To all whom it may concern:*

Be it known that I, WILLIAM R. WARREN, a citizen of the United States, residing in Manhattan borough, in the city, county, and State of New York, have invented new and useful Improvements in Rotary Kilns, of which the following is a specification.

In the manufacture of cement it has been found that the process is expedited by having the material subdivided or in small quantities while in the kiln or being burned to reduce to clinker. By having a partition suitably applied the requisite subdivision is effected, while at the same time the feed and discharge of material can go on the same as heretofore.

This invention is set forth in the following specification and claims and illustrated in the annexed drawings, in which—

Figure 1 is a sectional side elevation of a kiln embodying this invention. Fig. 2 is an end view of the cover. Fig. 3 is a section along *x x*, Fig. 1. Fig. 4 shows a modification.

A kiln of cylindrical or other shape in cross-section is shown at *a*. A partition of suitable shape is shown at *b* dividing the kiln longitudinally. Two or more compartments may be formed, according to the number of partitions. In Fig. 4 are shown two partitions *b'*. The fuel is fed into the kiln through a single opening at the low end or through two or more openings, as desired. The partition, Fig. 2, is constructed in whole or in part of the same material or its equivalent as the lining of the kiln.

The object of my invention is to provide two or more chambers in which the raw materials may be heated or dried and converted into clinker. By the use of two or more chambers the raw materials are more divided and more thoroughly turned over in the drying process than is possible in the one chamber, volume for volume. In other words, in two kilns of the same length the one fitted with two or more longitudinal chambers is capable of drying and converting into clinker a greater amount of raw material in a given time by means of the same or a less amount of fuel than a single-chamber kiln. The longitudinal partition or partitions may extend through the entire length of the kiln or only through a part of the length, as is shown in Fig. 1.

The fuel-intake pipes *d* may be of any suitable number—one or more—in any desired position and extended through corresponding openings in the shield or cover *c*. This shield may also have a sight-hole.

The chambers extend into or are formed at that portion of the kiln in which the combustion or decomposition of the material of manufacture takes place.

What I claim as my invention, and desire to secure by Letters Patent, is—

1. A kiln of suitable shape in cross section and provided with one or more partitions extended longitudinally through the kiln to divide the same into compartments and a fuel inlet common to both compartments.

2. A rotary kiln provided with a partition placed diametrically in the kiln and made to terminate short of each end of the kiln and a fuel - inlet common simultaneously to the compartments formed by said partition.

3. A rotary kiln provided with one or more transverse partitions in combination with a fuel-inlet common simultaneously to all compartments formed by the partition.

4. A kiln divided by a partition into compartments and having one or more fuel-openings common simultaneously to all the compartments.

5. A rotary kiln provided with one or more transverse partitions extended along part of the length of the kiln and fuel-openings common simultaneously to all compartments formed by the partition.

6. A kiln substantially cylindrical in contour and provided with longitudinally extending means whereby the kiln is formed with a plurality of chambers, said kiln provided with an end shield, and said end shield being provided with means for the admission of fuel to the chambers, the products of combustion being adapted to pass simultaneously through all the chambers.

In testimony whereof I have hereunto set my hand in the presence of two subscribing witnesses.

WILLIAM R. WARREN.

Witnesses:
GEORGE HULSBERG,
EDWARD WIESNER.